United States Patent
Powers et al.

(10) Patent No.: US 7,783,650 B2
(45) Date of Patent: *Aug. 24, 2010

(54) METHOD AND APPARATUS FOR CREATING A LINEAGE OF A DATA FIELD IN A DATA FLOW SYSTEM

(75) Inventors: Craig R. Powers, San Carlos, CA (US); Vladimir Gorelik, Palo Alto, CA (US)

(73) Assignee: Pitney Bowes Software Inc., Troy, NY (US)

( * ) Notice: Subject to any disclaimer, the term of this patent is extended or adjusted under 35 U.S.C. 154(b) by 741 days.

This patent is subject to a terminal disclaimer.

(21) Appl. No.: 11/522,704

(22) Filed: Sep. 18, 2006

(65) Prior Publication Data

US 2007/0016624 A1    Jan. 18, 2007

Related U.S. Application Data

(63) Continuation of application No. 09/565,775, filed on May 5, 2000, now Pat. No. 7,117,219.

(51) Int. Cl.
*G06F 7/00* (2006.01)
*G06F 17/30* (2006.01)

(52) U.S. Cl. ............................ 707/756; 707/999.002; 700/83

(58) Field of Classification Search ................ None
See application file for complete search history.

(56) References Cited

U.S. PATENT DOCUMENTS

| | | | | | |
|---|---|---|---|---|---|
| 5,710,917 | A | * | 1/1998 | Musa et al. | 707/201 |
| 6,039,245 | A | * | 3/2000 | Symonds et al. | 235/379 |
| 6,122,592 | A | * | 9/2000 | Arakawa et al. | 701/201 |
| 6,477,434 | B1 | * | 11/2002 | Wewalaarachchi et al. | 700/83 |
| 6,513,019 | B2 | * | 1/2003 | Lewis | 705/35 |
| 6,694,310 | B1 | * | 2/2004 | Yu et al. | 707/4 |

* cited by examiner

*Primary Examiner*—Sathyanarayan Pannala
(74) *Attorney, Agent, or Firm*—Steven Shapiro; Angelo N. Chaclas

(57) ABSTRACT

A method and apparatus for creating a lineage for a data field is disclosed. The method may include creating a unique identifier for a data field. Also, a record of the origin of data is created when the data is inserted into the data field; however this is not required. The record of the origin of data is associated with the unique identifier for the data field. The lineage for a data field may be viewed. In so doing, the transformations to the data field may be shown.

10 Claims, 5 Drawing Sheets

METHOD AND APPARATUS FOR CREATING A LINEAGE OF A DATA FIELD IN A DATA FLOW SYSTEM

This application is a Continuation of commonly owned, U.S. patent application Ser. No. 09/565,775, filed May 5, 2000 now U.S. Pat. No. 7,117,219 which is incorporated herein by reference in its entirety.

BACKGROUND OF THE INVENTION

Datamarts are types of software programs that allow users to aggregate, sort, sift, and manipulate data from a number of sources. These sources of data can be, for example, databases or internet web servers. Users describe the types of data they wish datamarts to access, from which source, and how that data should be manipulated.

In some systems, the user defines a script for accessing the data in the data resources. The scripts typically include data access information. The interfaces for generating such scripts are usually text based and do not allow the user to visualize the flow of the data accesses and the manipulations on the data.

Therefore, what is needed is an improved data access description method and apparatus that more clearly shows the data being accessed and the types of operations being performed on that data.

SUMMARY OF THE INVENTION

A method and apparatus for creating a lineage for a data field is disclosed. The method includes creating a unique identifier for a data field. Also, a record of the origin of data is created when the data is inserted into the data field. The record of the origin of data is associated with the unique identifier for the data field.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
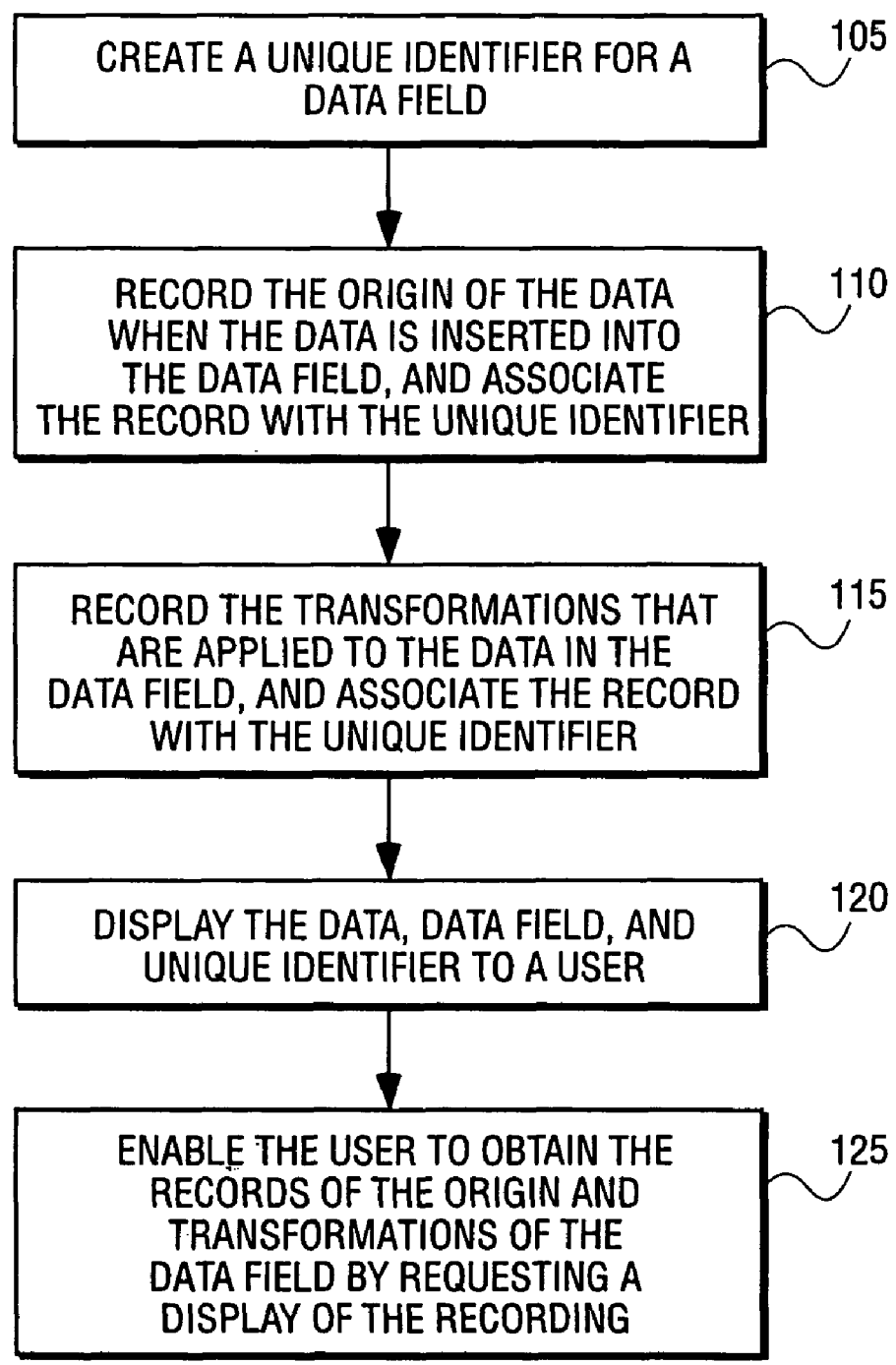
FIG. 1 is a flow diagram of one embodiment of process for creating a data lineage.

A method and apparatus for creating a lineage for a data field is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

A method and apparatus for tracking the flow of data, including the manipulations and processing applied thereto, back to its source is described. The flow is depicted graphically and is referred to herein as a plan. Selecting any location in the plan (e.g., a box, a link, etc.) causes a history of the transformations (e.g., processing, manipulations) that have occurred on the data up to that point in the flow to be displayed.

The flow may include transforming the records in one or more steps before displaying information in the records on a client. These transformations can include transforming the data in the fields, adding new fields, deleting fields, adding more records, removing records, changing the amount of data, generating new data, removing data, and/or consolidating data.

In order to track and record the transformations to data in a data field, a schema is used to track a flow of each data field. In one embodiment, every field in every record is associated with a unique ID that is referred to herein as a Globally Unique Identifier (GUID). Therefore, at every step of the data field's input and output points, the system can indicate the field's schema by tracing the field's GUID backwards in the data flow. This enables the system and, thus, the user, to locate the original source of the data and determine which processing steps the data experienced. Thus, the system maintains a record of the steps that modified data, thereby allowing the user to determine the specific transformation step or steps used to generate the data being displayed.

An advantage of the method of recording the data lineage for specific data is that a user can determine the validity of the data. For example, when data is displayed to an end user, the user may question the validity or accuracy of the data. Using the tracking methodology described herein, the user may determine the origin of the data and the transformations that were performed on the data. Thus, the data lineage tracks and records the transformation history of specific data, thereby enabling an end user to determine how the data being displayed is computed or arrived at.

FIG. 1 is a flow diagram of a process for creating, recording, and displaying the lineage of the data in a data field. The process may be performed by processing logic that comprises hardware, software, or combination of both. Referring to FIG. 1, a unique identifier is created for a data field, step 105. In one embodiment, when data is initially inserted into the data field, the original source of the data is recorded to create a record of the origin of the data. This record of the origin of the data is associated with the field's unique identifier, step 110. When the data in the data field is transformed during subsequent steps, the transformations that are applied to the data are recorded, and the record of the transformations is associated with the unique identifier, step 115. The data in the data field and the unique identifier are displayed to a user, step 120. The user is enabled to obtain the records of the origin and transformations associated with the unique identifier for the data field, step 125, by requesting display of the records.

In one embodiment, the user may right click a mouse button, or pull down a menu, to select a field. A dialogue box is displayed that shows all the fields, and the user can click on a specific field. On the right side of the field, a display shows where the field originated, the transformation steps that were performed on it, where it went, and what type it is.

For example, suppose a user is looking at the screen at a salary record of an employee. The record includes the salary, the title, and the employee's name. If the employee has a salary of $20,000, the user may want to know how that number was determined. To determine where the salary data came from, the user selects a block or portion thereof, or a link in the display for the salary record, and the system automatically displays the history of the flow of the data being processed by the block. In this manner, the user can trace the information back to determine the transformations. The user can then go back to that specific step and determine the original database SQL query that was used in that step.

Thus by examining the flow of a field, a user can determine where the field came from and what flow path it took, even whether a field is derived from another field. Because a GUID is assigned to every field, as well as storing the lineage of the input and output of every step, a user is able to track the lineage back to its origin. An advantage of this method is enabling a user to know where the data field came from, so that the user can determine whether the data in the field is valid, and if the data is not valid, then it enables the user to correct the data.

Note that in one embodiment, the plan does not have to be executed nor does data have to be returned to examine the information about path and transformations. This may be done by looking at the plan's definition.

Figure 2:
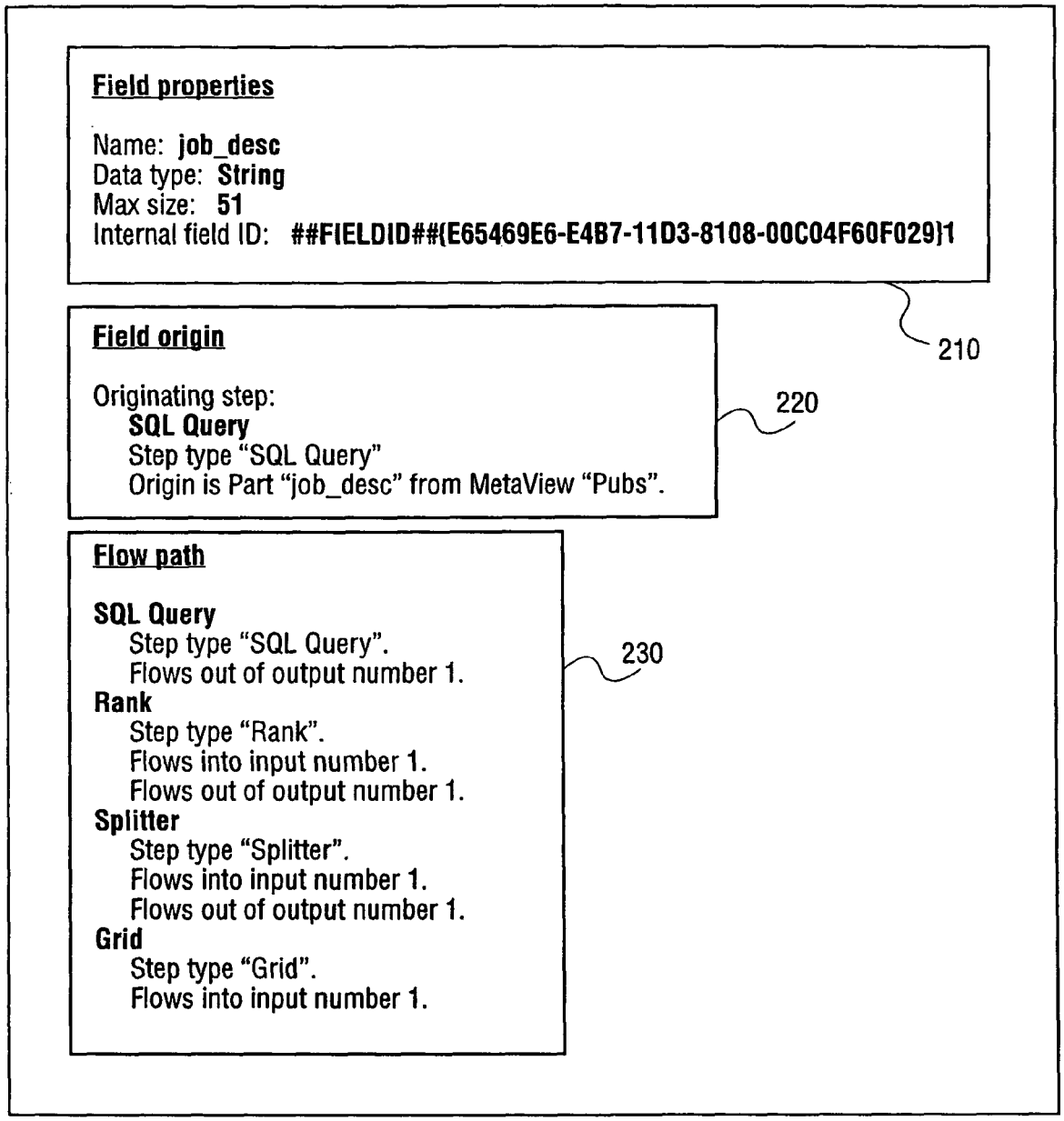
FIG. 2 illustrates one embodiment of a data lineage display device.
Figure 3:
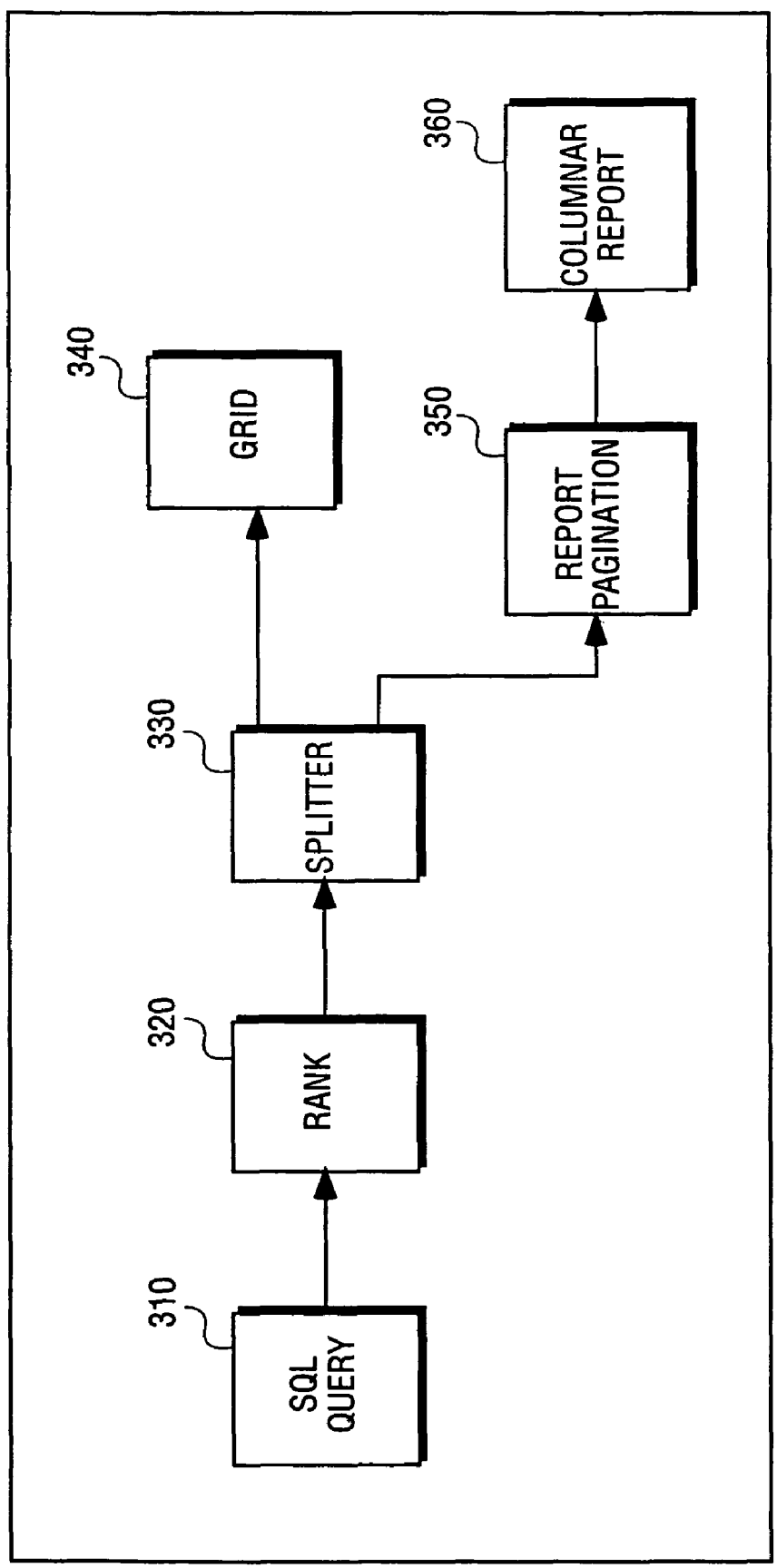
FIG. 3 illustrates another embodiment of a data lineage display device.

FIGS. 2 and 3 show examples of a display of the data lineage to a user. FIG. 2 shows a text description of the lineage and FIG. 3 shows a graphic icon description of the lineage.

FIG. 2 shows the field properties 210 of a data field, and the field origin 220 of the data field. FIG. 2 also shows the flow path 250 of the data in the data field. For example, the flow path may be from an SQL query to a rank, then a splitter and finally to a grid.

FIG. 3 uses icons to display the flow path of the data in a data field. The SQL query 310 flows to rank 320. Splitter 330 receives the data, splits it, and sends it to grid 340 and report pagination 350. The data is then displayed in columnar report 360.

Figure 4:
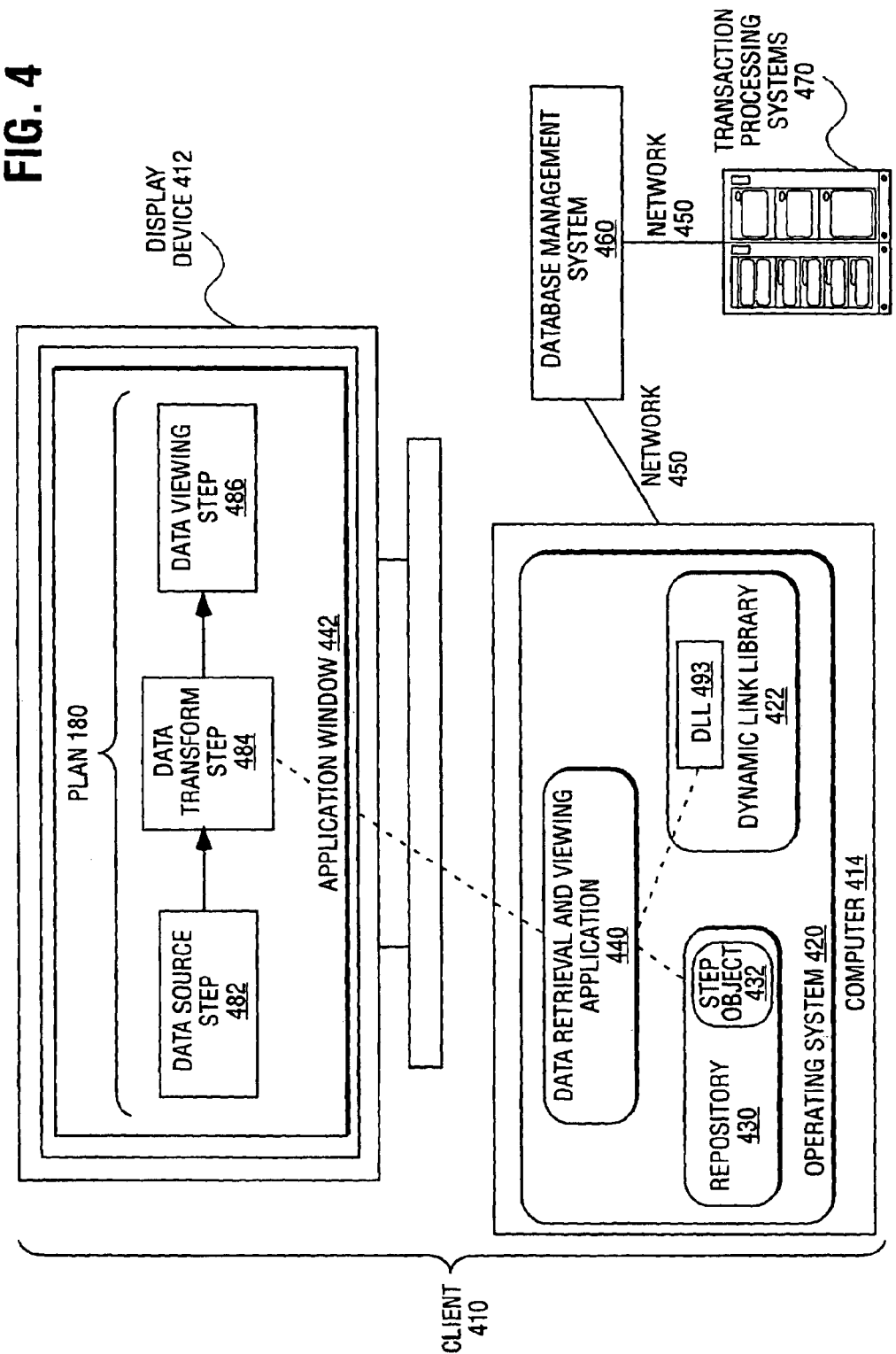
FIG. 4 illustrates one embodiment of a data retrieval and viewing system with an extensible architecture.
Figure 5:
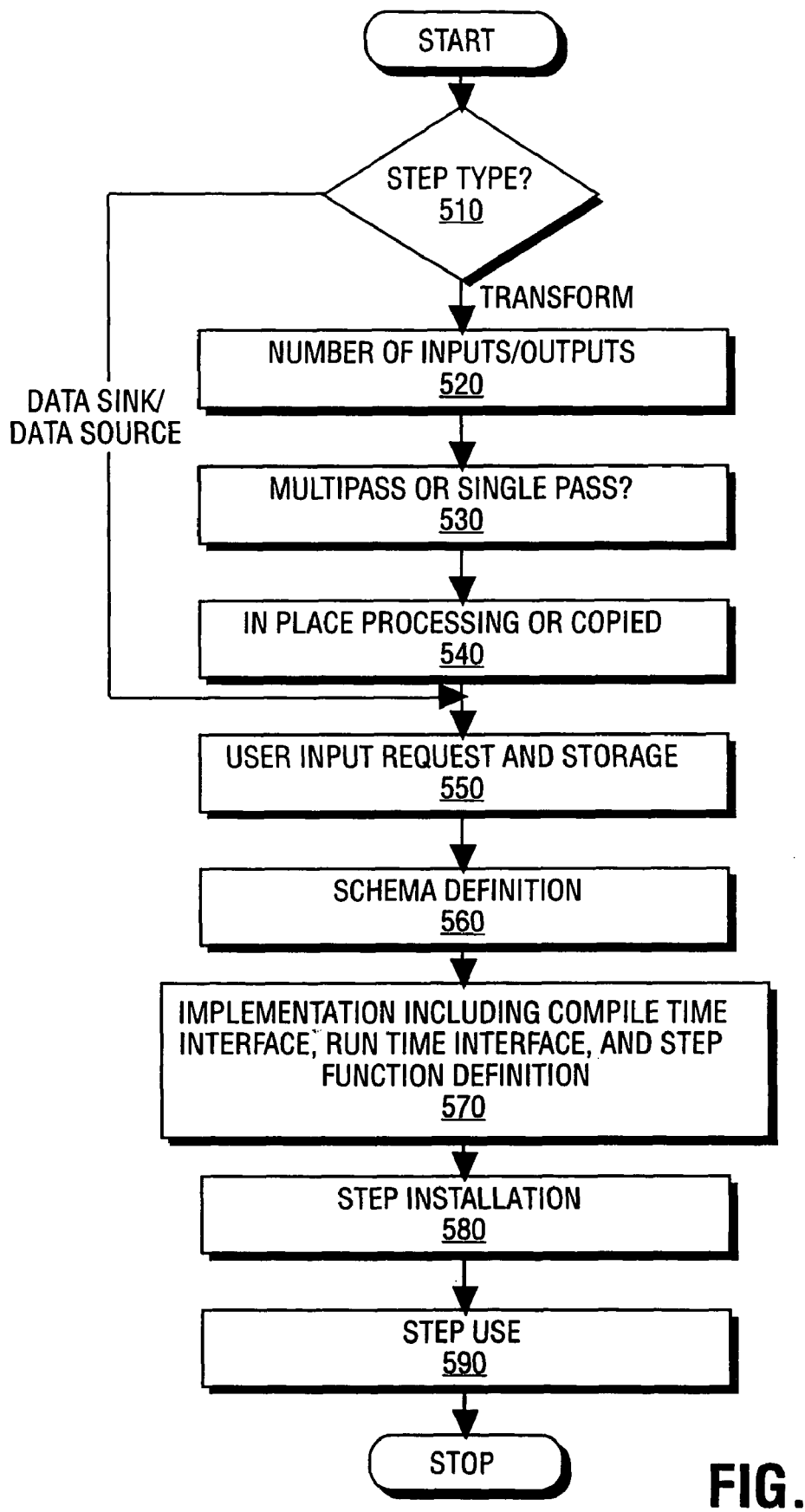
FIG. 5 is a flow diagram of one embodiment of process for defining and implementing a new step.

FIGS. 4 and 5 illustrates a data retrieval and viewing system with an extensible architecture that create a data lineage for the retrieved data using the data lineage method and apparatus shown in FIGS. 1, 2, and 3.

FIG. 4 includes a transaction processing system 470, a database management system 460, and a client 410. The client 410 includes a computer 414 and a display device 412. The computer 414 includes an operating system 420, a dynamic link library 422, a repository 430, and a data retrieval and view application 440. The application 440 causes the display device 412 to display an application window 442. The application window 442 shows a graphical representation of a plan 180. In one embodiment, the plan 180 includes a data source step 482, a data transform step 484, and a data viewing step 486. The data transform step 484 is associated with a step object 432 in the repository 430 and a dynamic link library executable (DLL) 493. The client 410 communicates over the network 450 with the database management system 460. The database management system 460 communicates over network 450 with the transaction processing system 470.

The following describes the data entry and warehousing systems of FIG. 4. The online transaction processing system 470 collect data for use by the database management system 460. The online transaction processing systems 470 are often optimized for data entry. The database management system 460 includes a system for accessing and analyzing existing data. In one embodiment, the database management system 460 includes a data warehouse where corporate data is consolidated and fed to smaller data warehouses (called data marts). However, in the example of the system of FIG. 4, the data warehouse and data mart functions are both performed by the database management system 460. Oracle Corporation, of Redwood Shores, Calif., provides data warehouses and online transaction processing systems 470. In one embodiment, the database management system 460 resides on a separate computer than the client 410 or the online transaction processing system 470. In another embodiment, other hardware and software configurations are supported, such as the client 410 and the database management system 460 sharing the same database management system (e.g., a database system from Oracle, Inc. of Redwood Shores, Calif.). In this embodiment, the client 410 uses the database system as the storage portion of the repository 430.

The following describes the client 410 in greater detail. The client 410 includes a computer 414 and a display device 412. Various computers 414 used in various embodiments of the invention include IBM-PC compatible computers, Macintosh™ computers, and workstations from Sun Microsystems, Inc., Hewlett-Packard and Silicon Graphics, Inc. The display device 412 includes a video monitor for displaying graphical and textual information generated by the data retrieval and viewing application 440 and the operating system 420.

The client's 410 operating system 420 includes the Window's NT™ operating system. Other embodiments of the invention use other operating systems, such as Unix, Max OS™, and Windows 3.1™. Importantly, in one embodiment, the operating system provides applications with an interface for easily adding additional features to the applications In one embodiment, the operating system supports the dynamic link library 422 for extending the functionality of an application. In one embodiment, the operating system 420 supports the Microsoft Component Object Model (COM) interface.

The COM interface allows each DLL to support multiple interfaces. The COM interface allows the application 440 to interrogate a COM object to determine which interface is supported. In one embodiment, this feature is exploited to allow different steps to provide different functions. For example, a step can require a single pass or a multiple pass examination of the input data; each type of pass using a different interface. For example, a step may be more efficiently performed if multiple records are accessed simultaneously (e.g., sorting transform step), while a different step may be more efficiently performed processing only a single record at a time (e.g., a splitter) in a single space. Another example occurs where a step uses the original data or uses copies of the original data, each type of data used is implemented using a different interface.

The COM interface also allows COM objects to be universally registered for use by applications in the operating system 420. Using the COM globally unique identifier (GUID) system, the client 410 need not know where the object is in the client 410. The registration process also allows the COM object to communicate the name of the object to the application 440. The COM interface also allows a developer to have a step prompt the user for input as part of the execution of that step. Further, the COM interface allows the step to provide the information to the application 440. In one embodiment, the application 440 ensures that the user information is kept on the client 410 or the repository 430 once the information is obtained from the user so that the user is not prompted in future executions of that step in the corresponding plan 180.

The following describes the data retrieval and viewing features of the client 410. The data retrieval and viewing application 440 accesses data from the database management system 460 using the plan 180. Thus, a user creates a plan 180 to command the application 440 to retrieve, process and display the data from the database management system 460. The plan 180 includes a number of steps. Each step in the plan 180 defines either a source of data, a data transform, or a sink of data. The example plan 180 of FIG. 4 includes a data source step 482, a data transform step 484 and a data viewing step 486. The data source step 482 defines the source of the data to be used by the plan 180 (e.g., a definition of a specific table and column in the database management system I Q). The data transform 484 defines how that sourced data is to be transformed (e.g., a definition of a conversion from English pounds to American dollars). The data viewing step 486 is an example of a data sink. The data viewing step 486 defines where the data from the data transform step 484 should be output. For example, the data viewing step 486 may cause a table to be displayed in the application window 442.

The repository 430 keeps the plans 180 and the mappings of the data in the database management system 460 to data in the application 440. The repository 430 also holds the definitions of a set of steps that can be used in a plan 180. A step object 432 corresponds to each step that can be used. Although the repository 430 is shown in the client 410, in other embodiments the repository 430 may be in a second computer or divided between the client 410 and another computer. For example, in one embodiment, the client 410 includes the portion of the access functions of the repository 430 while a second computer includes the storage functions of the repository 430. In this embodiment, the store portion of the repository 430 is implemented using a database server such as is available from Oracle, Inc. or Sybase, Inc., both of California.

In one embodiment, each step is created and used according to a COM interface. For example, the data transform step 484 is associated with step object 432 and DLL 493. The step object 432 is used within the application 440 to reference the DLL 493. The DLL 493 includes functions used by the application 440 to perform a specific transform. Therefore, the functionality of the application 440 can be easily extended by defining new steps including their corresponding DLL 493 and step object 432.

Step Design and Implementation

FIG. 5 illustrates one embodiment of a method of defining implementing a new step for use in the system of FIG. 4. This embodiment is implemented using the COM based interface defined by Microsoft Corporation, Inc., however, other embodiments are implemented using other architecture extension systems, such as OpenDoc™, available from Apple Computer, Inc., CORBA from Sun Microsystems, etc.

The following describes a method of creating a new step using the COM interface. However, in one embodiment, a C++ library is provided that removes some of the more tedious steps of defining the new step. However, this C++ library technique is a subset of the following steps.

The developer starts with an idea of adding a specific type of step to the application 440. The function of the step is first defined (e.g., a sorting function), then the developer performs steps 510 through step 570.

Block 510 through block 560 are performed by a developer to define how the new step will function. At block 510, developer decides which type of step to create (e.g., transform, data sink or data source). Block 520 through block 540 are executed if the step is a transform.

At block 520, the developer determines the number of inputs of the step and the number of outputs. For example, if the transform performs a split of any received data, then the transform will have one input and two outputs. If the transform performs a union of any received data, then the transform has two inputs and one output.

At block 530, the developer decides whether the step will use the single pass or the multiple pass interface.

At block 540, the developer decides whether the step will use processing of received data or copies of the received data.

At block 550, the developer decides whether any user input needs to be obtained prior to the use of the step within the plan. If the user input is required, the developer decides how the user information is stored. In one embodiment, the repository 430 stores that information. In one embodiment, the user data is stored as a property list. Each property has a name and a value. The developer also defines the user interface to prompt the user for the information (e.g., dialog box). In one embodiment, the developer defines the user interface by writing executable code that provides a user interface when executed. In one embodiment, the executable code includes calls to the operating system to help provide the user interface.

At block 560, the developer defines the data schema for the data manipulated in the step. The data schema defines how the data is organized. If the step is a sink, then block 560 need not be performed.

At block 570, the developer writes the code to provide the various interfaces used by the application 540 and the step's function. The developer writes the compile time interface, the run time interface and the step function definition. The compile time interface defines the output of the step (not necessary if the step is data sink). In one embodiment, the compile time interface defines the fields and the field types of the data output by the step using a record descriptor. The record descriptor describes the records output from the step. A record descriptor includes the names of the fields, the types of the fields, and the positions of the fields in the records. The run time interface is what is called by the application 440 when the DLL 493 is executed. The run time interface is the main entry point to the DLL 493 called by the application 440 when the plan 180 is executed. The step's function definition is the executable code that causes the data to be retrieved, transformed, or output. In one embodiment, the repository 430 stores this information. In one embodiment, the user data is stored as a property list. Each property has a name and a value. The developer also defines the user interface to prompt the user for the information (e.g., a dialog box). In one embodiment, the developer defines the user interface by writing executable code that provides a user interface when executed. In one embodiment, the executable code includes calls to the operating system to help provide the user interface.

At block 560, the developer defines the data schema of the data manipulated in the step. The data schema defines how the data is organized. If the step is a sink, then block 560 need not be performed.

At block 570, the developer writes the code to provide the various interfaces used by the application 440 and the step's function. The developer writes the compile time interface, the run time interface and the step function definition. The compile time interface defines the output of the step (not necessary if the step is a data sink). In one embodiment, the compile time interface defines the fields and the field types of the data output by the step using a record descriptor. The record descriptor describes the records output from the step. A step descriptor includes the names of the fields, the types of the fields, and the positions of the fields in the records. The run time interface is what is called by the application 440 when the DLL 493 is executed. The run time interface is the main entry point to the DLL 493 called by the application 440 when the plan 180 is executed. The step's function definition is the executable code that causes the data to be retrieved, transformed, or output. For example, the step's function definition is the sort function for a sorting step.

From block 570, the developer can compile the definition to generate the DLL 493. The developer also receives a unique identifier for the DLL 493. The developer also receives a unique identifier for the DLL 493. The developer also receives a unique identifier for the DLL 493, e.g., a GUID such as a class identifier, for use by the operating system 420.

After the developer has generated the DLL 493, a user can install and use the new step. At block 580, the user uses an administrative tool to install the new step for use by the application 440. The administrative tool includes a software program that creates the step object 432 in the repository. The step object 432 includes the reference to the DLL 493 (e.g., a GUID), and a user defined name for the new step. In another embodiment, the step object 432 also includes a reference to a developer supplied icon for use in graphically displaying the plan 180. In another embodiment, the executable code is not stored in a DLL 493 but is stored in the repository 430. Once the step is installed, a user can then include the step in a plan 180.

In block 590, the new step is used. To use the step, the user uses the application 440 to include the new step in a plan 180. In one embodiment, a pull data processing model is used to execute a plan 180. That is, the list step in the plan 180 is asked to execute first. Then all the steps that provide data to that list step are prompted to execute. Then, all the steps that provide data to those steps are prompted to execute. This continues until the source steps are reached.

Thus, when the plan is executed, the step object 432 asked for its output from the next step in the plan 180. The step object 432, using its references to the DLL 493, causes the DLL 493 to execute, which will cause the DLL 493 to request its input from any preceding steps in the plan 180. The DLL 493 then processes the received data. Upon completion of execution, the DLL 493 provides the next step with the output formatted according to the run time interface.

We claim:

1. A computer-implemented method comprising:
   receiving a user request specifying a user-selected location in a plan displayed on a screen, the plan graphically depicting a data flow diagram illustrating a plurality of steps to perform on data, the plurality of steps beginning with a data source step and ending with a data viewing step; and
   in response to the user request, identifying steps applied to the data prior to the user-selected location in the plan, and displaying a list of the steps applied to the data prior to the user-selected location in the plan.

2. The method defined in claim 1 further comprising displaying data transformations.

3. The method defined in claim 2 wherein the data transformations are displayed without executing the plan.

4. A computer apparatus for creating a lineage for a data field comprising:
   means for creating a plan graphically depicting a data flow diagram illustrating a plurality of steps to perform on data, the plurality of steps beginning with a data source step and ending with a data viewing step;
   means for receiving a user request specifying a user-selected location in the plan;
   means for identifying steps applied to the data prior to the user-selected location in the plan; and
   means for displaying a list of the steps applied to the user-selected location in this plan.

5. The apparatus of claim 4, further comprising:
   means for displaying the data transformation.

6. The apparatus of claim 5, further comprising:
   means for displaying the data transformations without executing the plan.

7. A computer-implemented method for operating a data processing system, comprising the steps of:
   displaying on a screen a graphical representation of a data processing plan, said plan including a plurality of steps to perform on data, beginning with a data source step and ending with a data viewing step;
   receiving a user selection of one of said steps in said data processing plan; and
   in response to said user selection, displaying a list of steps applied to the data prior to the user-selected step in the plan.

8. The method of claim 7 wherein said data processing system incorporates a data mart and said data processing plan is a plan for processing data from said data mart.

9. The method of claim 7, further comprising displaying data transformations.

10. The method of claim 9, wherein the data transformations are displayed without executing the plan.

* * * * *